United States Patent [19]

Peng et al.

[11] Patent Number: 4,864,527

[45] Date of Patent: Sep. 5, 1989

[54] APPARATUS AND METHOD FOR USING A SINGLE CARRY CHAIN FOR LEADING ONE DETECTION AND FOR "STICKY" BIT CALCULATION

[76] Inventors: Victor Peng, 42 Holden St., Shrewsbury, Mass. 01545; William J. Bowhill, 4 Royal Crest Dr., Apt. 11, Marlboro, Mass. 01752; Nachum M. Gavrielov, 271 Meeting House Path, Ashland, Mass. 01721

[21] Appl. No.: 88,392

[22] Filed: Aug. 24, 1987

[51] Int. Cl.$^4$ .................................................. G06F 7/38
[52] U.S. Cl. ...................................... 364/748; 364/751
[58] Field of Search ................ 364/748, 745, 736, 751

[56] References Cited

U.S. PATENT DOCUMENTS 4,075,704  2/1978  O'Leary ............................. 364/748

Primary Examiner—Gene Wan

[57] ABSTRACT

In a floating point addition or subtraction procedure two shift operations of the operand fraction may be required. The first shift operation, based on the difference between the operand exponent arguments, involves aligning one of the operand arguments so that the addition or subtraction procedure between the operand fractions can be performed. In order to complete the associated computations correctly, it is necessary to know if any of the fraction positions removed from the fraction by the shift operation include non-zero signals, i.e., the operation typically referred to as computation of the "sticky" bit. The second important shift operation occurs after the addition or subtraction of the operand fractions has taken place. The interim resulting operand fraction must be normalized, i.e., a non-zero signal is placed in the most significant operand fraction bit position and the operand exponent argument adjusted accordingly. In order to accomplish this normalization, the position of the leading one (most significant non-zero) bit must be identified. The present invention utilizes a carry chain both for computing the "sticky" bit information and for detecting the leading one in an operand fraction.

18 Claims, 5 Drawing Sheets

APPARATUS AND METHOD FOR USING A SINGLE CARRY CHAIN FOR LEADING ONE DETECTION AND FOR "STICKY" BIT CALCULATION

BACKGROUND OF THE INVENTION

1. Field of the Invention

This invention relates generally to data processing systems and more particularly to data processing systems capable of executing floating point operations.

2. Description of the Related Art

In data processing systems, the floating point data format, in which a number is represented by an operand exponent argument designating the power to which the exponent base is raised and an operand fraction which is the multiplier of the exponential portion of the number, is frequently used to permit an expansion of the range of numbers capable of being processed by the system. The floating point number frequently uses an independent execution unit and calculations by the execution unit can limit the performance of the data processing unit.

Addition and subtraction procedures are the most commonly used floating point procedures, however, their execution requires a relatively intricate sequence of operations. The addition and subtraction procedures 101, as illustrated in FIG. 1, can be divided into two effective procedures, 102 and 103. The effective addition procedure 102 includes the addition procedure in which the signs of the operand fractions are the same and the subtraction procedure in which the signs of the operand fractions are different. The effective subtraction procedure 103 includes the addition procedure in which the signs of the operand fractions are different and the subtraction procedures in which the signs of the operand fraction are the same.

Referring to FIG. 2, the typical steps involved in implementing the effective subtraction operation 103, are indicated. In step 201, the difference between the operand exponent arguments is calculated. Based on this calculation, the operand exponent arguments must be made equal prior to performing the difference calculation and the operand fractions are correspondingly aligned in step 202. In step 203, the aligned operand fractions are subtracted and in step 204, the negation or determination of the two's complement is implemented when necessary. In step 205, the detection of the leading one (most significant non-zero) position is determined and based on the leading one determination, the resulting operand fraction is normalized, i.e., the resulting operand is shifted until a non-zero signal is in the most significant position. The resulting operand exponent argument must be adjusted in accordance with the normalization step. Where necessary, the resulting operand fraction is rounded off in step 207.

A floating point processor capable of performing the procedures and operations disclosed herein is described in "The MicroVAX 78132 Floating Point Chip" by William R. Bidermann, Amnon Fisher, Burton M. Leary, Robert J. Simcoe and William R. Wheeler; Digital Technical Journal, No. 2; March, 1986, pages 24–36.

The present invention relates to two steps in FIG. 2. In step 202, the alignment of fractions, the alignment is provided by shifting one of the operand fractions. In this shifting operation, a non-zero bit position may be removed from the operand fraction field. The subsequent subtraction operation can be inherently inaccurate if information regarding this bit (or these bits), typically referred to as a "sticky" bit, is not used in the subtraction operation. In step 205, the most significant non-zero bit position of the interim operand fraction must be identified and shifted to the most significant operand fraction position for the normalization of the operand fraction. In the past, each of these functions has been performed by separate apparatus. This implementation by two pieces of apparatus requires a relatively large number of elements and uses a large area on a semiconductor chip on which the floating point processor is fabricated.

A need has therefore been felt for a technique of performing the "sticky" bit computation and for determining the leading one position of an operand fraction using a reduced amount of apparatus.

FEATURES OF THE INVENTION

It is an object of the present invention to provide an improved data processing system.

It is a feature of the present invention to provide an improved execution unit for floating point procedures.

It is a more particular feature of the present invention to provide apparatus associated with a floating point execution unit for both determining the leading one position of an operand fraction and for calculating the value of the "sticky" bit during shifting operations.

SUMMARY OF THE INVENTION

The aforementioned and other features are accomplished, according to the present invention, by a chain of circuits, each circuit coupled to a bit position of an operand fraction, that has two modes of operation. In a first mode of operation, the circuits receive the CHAIN IN signal and the $i^{th}$ operand fraction bit position signal, Ai, and provides the CHAIN OUT signal and the LSHIFT(N-i) signals to determine the position of the leading one. In the second mode of operation, the circuit receives a ("STICKY" BIT IN)' signal, an operand fraction bit position signal, Ai and RSHIFT(i-l) signal and provides a ("STICKY" BIT OUT)' signal to determine the value of the "STICKY" BIT signal. The chain of circuits uses a precharged Manchester carry chain in both modes of operation.

These and other features of the present invention will be understood upon reading of the following description along with the drawings.

DESCRIPTION OF THE PREFERRED EMBODIMENT

1. Detailed Description of the Figures

Figure 1:
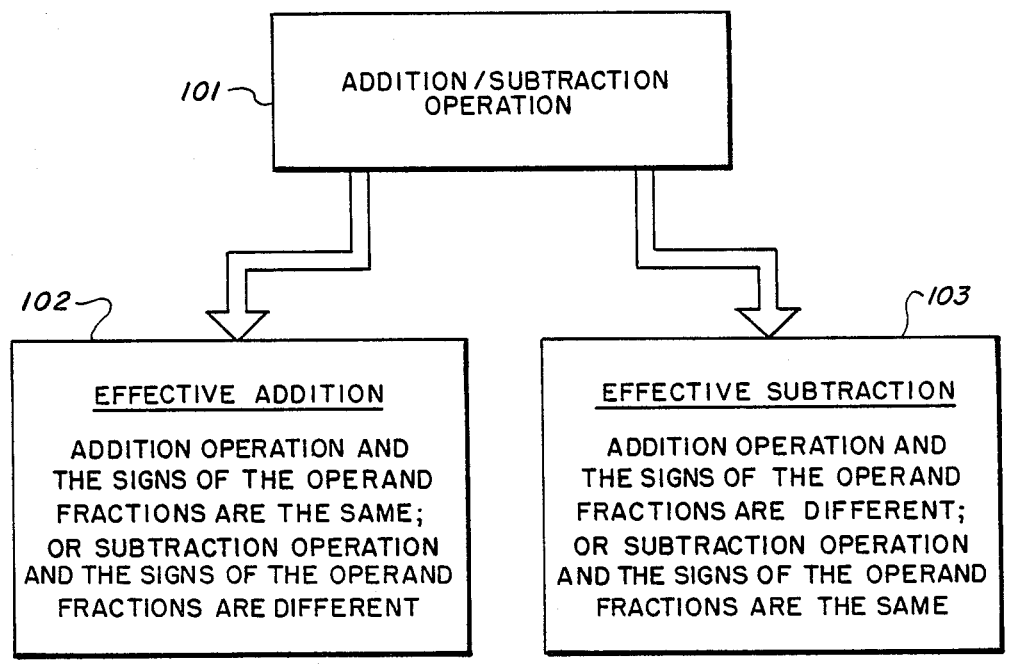
FIG. 1 is a diagram illustrating the relationship between the addition and subtraction procedures and the effective addition and subtraction procedures.
Figure 2:
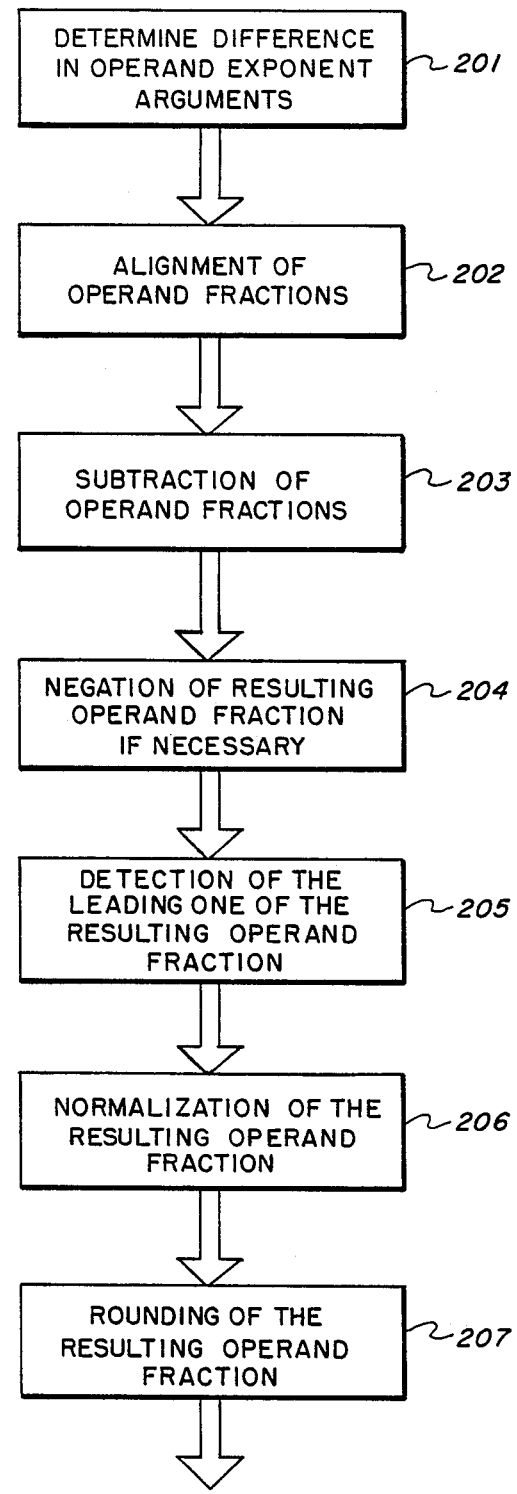
FIG. 2 is a diagram illustrating the principal steps in the effective subtraction procedure.

FIG. 1 and FIG. 2 have been described with reference to the related art.

Figure 3:
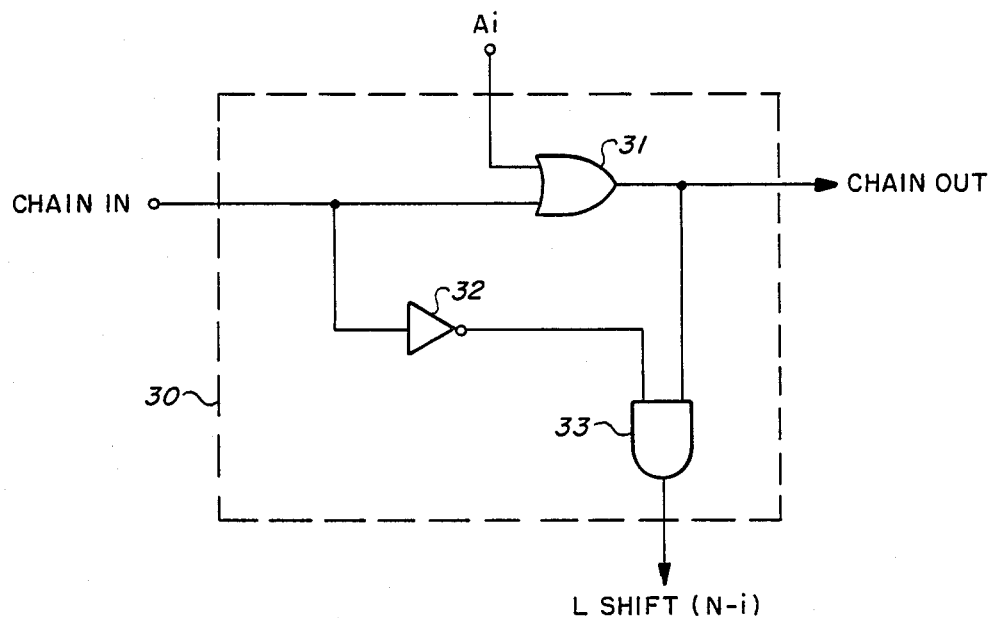
FIG. 3 is a logic diagram of an element in the leading one detection apparatus.

Referring next to FIG. 3, the logic diagram 30 of each of the elements comprising a leading one detection apparatus chain is illustrated. The CHAIN IN signal is received from the leading one detection element associated with the next more significant bit and is applied to one input terminal of logic "OR" gate 31. A second input terminal of the logic "OR" gate 31 has the signal from the $i^{th}$ position of the (intermediate) operand fraction, Ai, applied thereto. The CHAIN OUT signal from element 30 is the output signal from logic "OR" gate 31. The output signal from logic "OR" gate 31 is applied to a first input terminal of logic "AND" gate 33. The CHAIN IN signal is applied through inverter element 32 to a second input terminal of logic "AND" gate 33. The output signal of the logic "AND" gate 33 is the L(eft)SHIFT(N-i) signal where N is the number of operand fraction positions.

Figure 4:
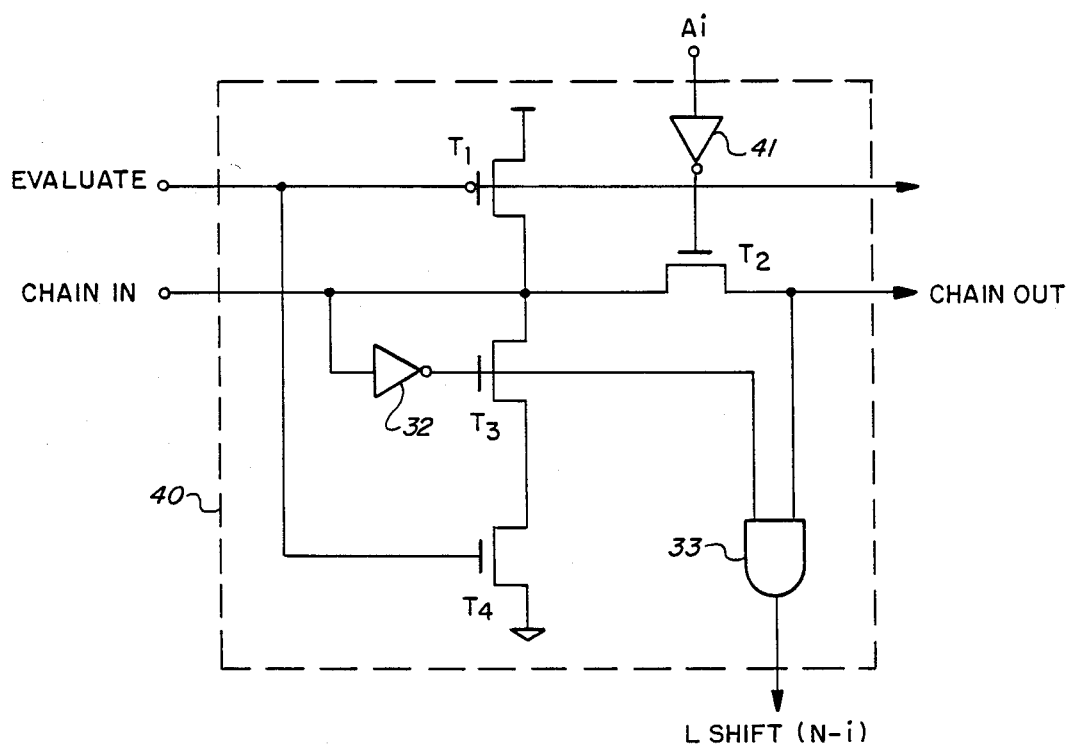
FIG. 4 is a circuit diagram of an element in a leading one detection apparatus illustrating the implementation in MOS (metal oxide semiconductor) technology.

Referring next to FIG. 4, the logic diagram 30 of FIG. 3, implemented in MOS technology utilizing a precharged Manchester carry chain, is shown as circuit 40. (The Manchester carry chain is described in "Introduction to VLSI Systems" by Carver Mead and Lynn Conway; published by Addison-Wesley Publishing Company; 1980.) In circuit 40, transistor T1 is the precharging transistor. The EVALUATE signal is applied to a gate terminal of p-channel transistor T1 and to the gate terminal of transistor T4, thereby controlling the precharging period and the period of use of the circuit 40. The inverting circuit 32 receives the CHAIN IN signal at an input terminal and applies an output signal to logic "AND" gate 33. the output terminal of inverter circuit 32 is also coupled to the gate terminal of transistor T3. The input signal from the operand fraction $i^{th}$ bit position, Ai is applied through inverting circuit 41 to a gate terminal of transistor T2. An input terminal of transistor T2 is coupled to the CHAIN IN signal and between the precharging transistor T1 and data evaluation transistor T3. The output terminal of transistor T2 is coupled to an input terminal of logic "AND" gate 33 and applies the CHAIN OUT signal. The output signal of logic "AND" gate 33 is the LSHIFT(N-i) signal.

Figure 5:
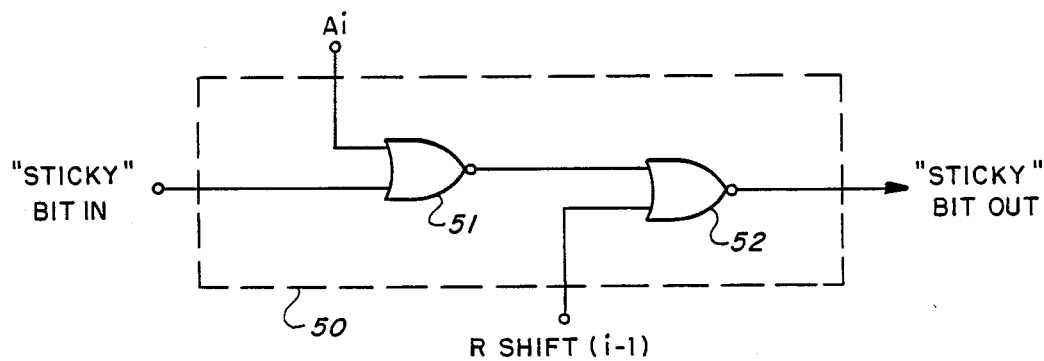
FIG. 5 is a logic diagram of an element associated with each bit position of an operand fraction for determining the "sticky" bit value.

Referring next to FIG. 5, a logic diagram 50 associated with the $i^{th}$ operand fraction position for determining the "sticky" bit is illustrated. A logic "NOR" gate 51 has the ("STICKY" BIT IN) signal applied to one input terminal and the signal from the associated operand bit position Ai applied to a second input terminal. {The notation (SIGNAL)' indicates the inverted logic signal or logical complement of the logic signal of the (SIGNAL) logic signal group.} The output signal from logic "NOR" gate 51 is applied to a first input terminal of logic "NOR" gate 52. A second terminal of logic "NOR" 52 has the RSHIFT(i-l) signal applied thereto. The output terminal of logic "NOR" gate 52 is the ("STICKY" BIT OUT) signal.

Figure 6:
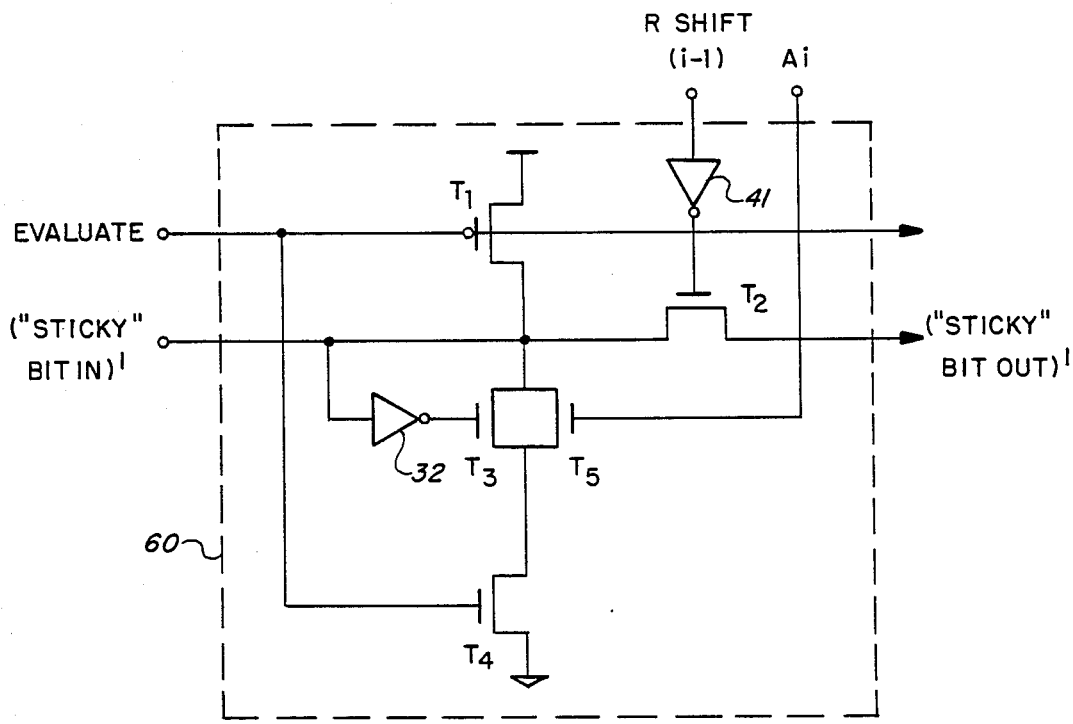
FIG. 6 is a circuit diagram of the element associated with each bit position of an operand fraction for determining the "sticky" bit value of FIG. 5 implemented in MOS (metal oxide semiconductor) technology.

Referring next to FIG. 6, the "sticky" bit logic diagram 50 of FIG. 5, implemented in MOS technology using a precharged Manchester circuit, is shown as circuit 60. Transistor T1 is the precharging transistor of circuit 60. The EVALUATE signal is applied to a gate terminal of p-channel transistor T1 and to a gate terminal of transistor T4 to control the period of charging and the period of circuit usage. Transistor T5 is coupled in parallel with transistor T3 and has the operand fraction bit position signal Ai applied thereto. A first terminal of transistor T2 receives the ("STICKY" BIT IN)' signal and is coupled between one terminal of T1 and coupled terminals of transistor T3 and T5. The ("STICKY" BIT IN)' signal is applied through inverter circuit 32 to a gate terminal of transistor T3. A second terminal of transistor T2 applies the ("STICKY" BIT OUT)' signal, while the gate terminal of transistor T2 has the inverted RSHIFT(i-l) signal applied thereto.

Figure 7:
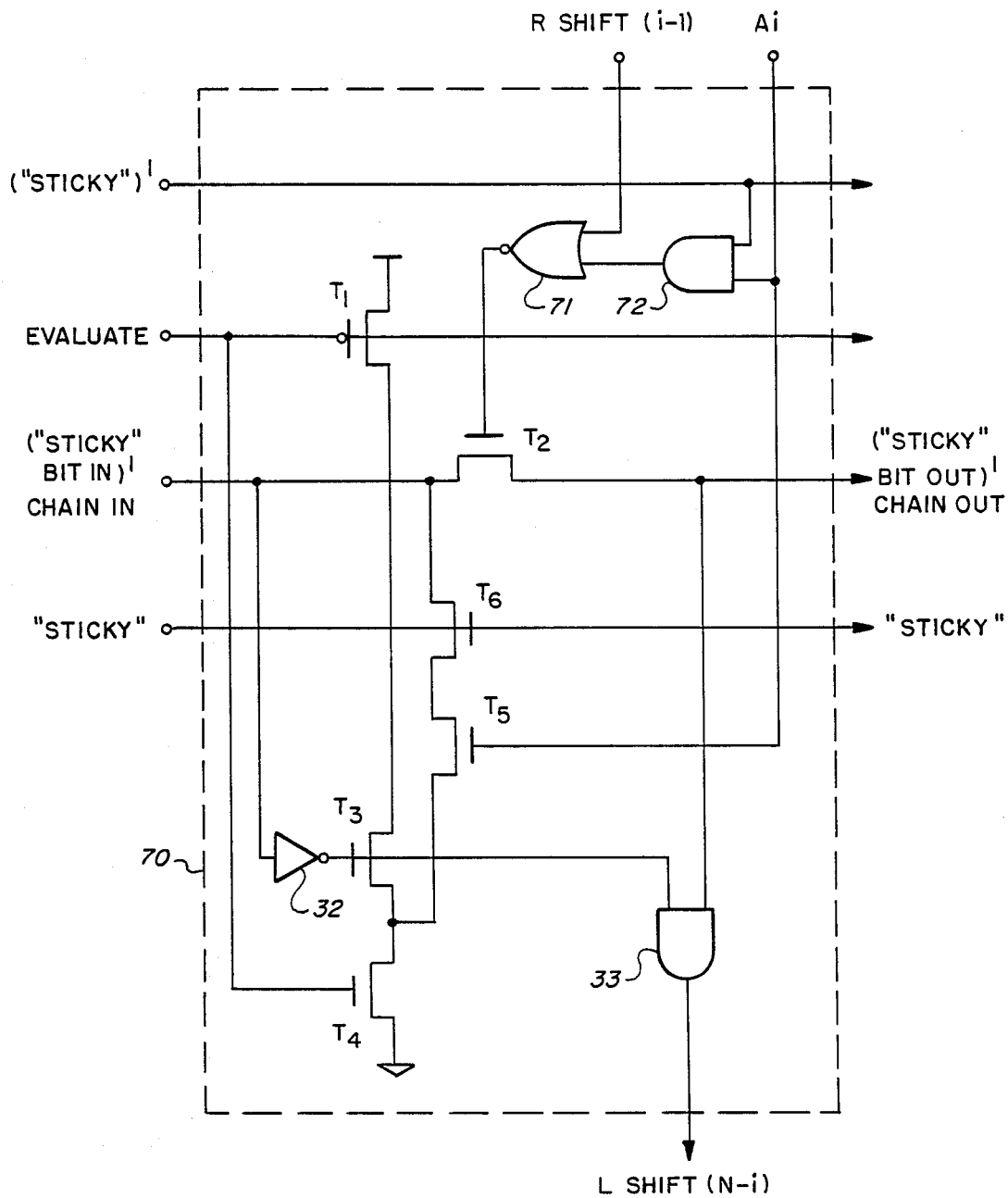
FIG. 7 is a circuit diagram of the apparatus for performing both the detection of the leading one signal and for the determination of the "sticky" bit value.

Referring next to FIG. 7, the circuit 70 associated with each bit position of the operand fraction, according to the present invention is, shown. The transistor T2 has the ("STICKY" BIT IN)'/(CHAIN IN) applied to one terminal thereof and the ("STICKY" BIT OUT)'/(-CHAIN OUT) signal is applied to a second terminal thereof. Transistor T1 is the precharging transistor. The EVALUATE signal applied to a gate terminal of p-channel transistor T1 and a gate terminal of transistor T4. Transistors T1 and T3 are coupled to the first terminal of transistor T2. The first terminal of transistor T2 is coupled through transistors T6 and T5 to coupled terminals of transistors T3 and T4. Transistor T6 has a "STICKY" signal applied to a gate terminal thereof, while the gate terminal of transistor T5 has the operand $i^{th}$ bit position signal, Ai, applied thereto. The ("STICKY" BIT IN)'/(CHAIN IN) signal is applied to an input terminal of inverter circuit 32, while an output terminal of inverter circuit 32 is coupled to a gate terminal of transistor T3 and to an input terminal of logic "AND" gate 33. A second input terminal of logic "AND" gate 33 has the ("STICKY" BIT OUT)'/(-CHAIN OUT) signal applied thereto. The output signal of logic "AND" gate is the LSHIFT(N-i) signal. A logic "AND" gate 72 has the ("STICKY")' signal applied to an input terminal. A second input terminal of logic "AND" gate 72 has the operand fraction Ai signal applied thereto. The output signal of logic "AND" gate 72 is applied to a first input terminal of logic "NOR" gate 71, while the RSHIFT(i-l) signal is applied to a second input terminal of logic "NOR" gate 71. The output terminal of logic "NOR" gate 71 is coupled to the gate terminal of transistor T2.

2. Operation of the Preferred Embodiment

Referring once again to FIG. 3 and FIG. 4, the logic equations solved by the chain of elements (assuming the operand fractions have 56 bit positions, A55{most significant bit or msb} to A0{least significant bit or lsb}) is as follows:

$$LSHIFT0 = A55$$

$$LSHIFT1 = (A55)'*A54$$

$$LSHIFT2 = (A55)'*(A54)'*A53$$

$$LSHIFT3 = (A55)'*(A54)'*(A53)'*A52$$

$$\ldots$$

$$LSHIFT56 = (A55)'*(A54)'* \ldots *A0$$

where:

LSHIFT0 is positive when a zero position shift is needed;

LSHIFT1 is positive when a one position shift is needed;

..........

LSHIFT56 is positive when a fifty-six bit position shift is needed to normalize the operand fraction.

The leading one detection is performed on the interim operand fraction to determine how large a shift is required to normalize the operand fraction, i.e., to locate the largest non-zero logic signal in the most significant bit (msb) operand fraction position.

Referring to FIG. 5 and FIG. 6, the algorithm accomplished by these cells can be understood as follows:

"Sticky" bit value=(A0+A1)*RSHIFT2+(A0 +A1 +A2)*RSHIFT3 +(A0 +A1 +A2 +A3)*RSHIFT4 +.......... where A0 is the least significant bit (lsb), A1 is the next more significant bit above A0, etc.

RSHIFT1 will be a positive signal when a right shift of 1 bit position is required, RSHIFT2 will be a positive signal when a right shift of 2 bit positions is required, etc.

+ designates the logical OR operation.

The "sticky" bit indicates whether any of the bits that were shifted off to the right during the alignment step 202 of FIG. 2 were non-zero. When non-zero bit signals are shifted out of the operand field during the alignment process, the computation becomes inherently inaccurate and the subtraction step 203 of FIG. 2 must be modified to obtain maximum accuracy.

Referring once again to FIG. 7, this figure can be compared with FIG. 4 and FIG. 6. Transistors T1, T2, T3 and T4 and inverter circuit 32 are common to the circuit 40 of FIG. 4 and to circuit 60 of FIG. 6 and are included in circuit 70 of FIG. 7. Logic "AND" gate 33 is used in circuit 40 and is included in circuit 70. Transistor T5 is included in circuit 60 and is implemented in circuit 70. Circuit 40 and circuit 60 include inverter circuit 41, however, in circuit 70, this inverter circuit 41 is replaced by elements selecting either Ai signal or the RSHIFT(i-l) for application to the gate terminal of transistor T2. In the implementation shown in FIG. 7 for the leading one detection mode of operation and for the "sticky" bit value determination, circuit 70 responds to two control signals, ("STICKY") and ("STICKY")'. For the leading one detection mode of operation, the ("STICKY") signal neutralizes transistor T6. All the RSHIFT(i-l) signals are inactive in this mode of operation. Consequently, an inverted Ai signal is applied to the gate terminal of transistor T2. Similarly, to use the "sticky" bit mode of operation, the ("STICKY")' signal prevents the Ai signal from being applied to the gate terminal of transistor T2 while the inverted RSHIFT(i-l) signal is applied thereto. Transistor T5 is coupled through transistor T6 to the first terminal of transistor T2.

The invention uses the same Manchester carry chain to perform the leading one determination operation and the "sticky" bit determination. The implementation of the two functions in a single circuit provides an overall reduction in the implementing circuit elements without compromise in performance. While the saving in semiconductor chip area is implementation dependent, the savings can vary from 16% {C(omplementary)MOS} to 30% {N(-channel)MOS} excluding the output logic "AND" gate.

It will be clear that the technique for combining the leading one detection apparatus and the "sticky" bit determination apparatus is not limited to any particular floating point processor implementation, but can be used with multiplicity of implementations, such as floating point processors complying with the IEEE 754 standard.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Floating point apparatus for executing floating point addition and subtraction operations, said apparatus comprising:

addition means for executing floating point effective addition operations;

subtraction means for executing floating point effective subtraction procedures, said subtraction means including an operand register for storing operands to be aligned and for operands to be normalized, wherein said subtraction means includes identification means coupled to said operand register for identifying a leading one in response to a first control signal and for identifying a "sticky" bit value in response to a second control signal, said identification means having:

a plurality of circuit means, each of said circuit means adapted to receive a signal from an associated operand register bit position, each of said circuit means receiving a signal in from a circuit means associated with a next more significant operand register bit position and applying a signal out to circuit means associated with a next less significant bit operand register bit position.

2. The floating point apparatus of claim 1 wherein said plurality of circuit means is responsive to a first control signal for detecting said leading one position, a one of said plurality of circuit means being responsive to a right shift signal when identifying said "sticky" bit value in response to said second control signal.

3. The floating point apparatus of claim 2 wherein a one of said circuit means applies a left shift signal when said first control signal is present.

4. The floating point apparatus of claim 3 wherein said plurality of circuit means are implemented in MOS technology, said plurality of circuits being coupled in a Manchester chain.

5. The floating point apparatus of claim 4 wherein each of said circuit means is responsive to an associated operand fraction bit position signal and a transfer in signal from said circuit means associated with a next more significant operand bit position to provide a right shift signal identifying a magnitude of a shift associated with an operand in said operand register when said first control signal is applied to said plurality of circuit means.

6. The floating point apparatus of claim 5 wherein each of said circuit means is responsive to said associated operand register bit position signal, a right shift signal and said transfer in signal from a circuit means associated with a next more significant operand fraction bit position for providing a output signal identifying said "sticky" bit value when said second control signal is applied to said plurality of circuit means.

7. The floating point apparatus of claim 5 wherein said circuit means includes:
 a first transistor, said first transistor having a first terminal for receiving said transfer in signal from said circuit means, said circuit means associated with a next more significant operand register bit position, said first transistor having a second terminal for applying said transfer out signal to said circuit means associated with said next less more significant operand register bit position, wherein a gate terminal of said first transistor has a one of an inverted logic signal from said associated operand register bit position and said right shift signal applied thereto;
 a second transistor for precharging said first terminal of said first transistor first terminal;
 a third transistor coupled to said first transistor first terminal; and
 an inverter circuit having said transfer in signal applied thereto, an output signal of said inverter circuit being applied to a gate terminal of said third transistor.

8. A method of performing an effective subtraction operation, said method comprising the steps of:
 determining a difference in operand exponent arguments;
 aligning operand fractions, said aligning step including the step of calculating a "sticky" bit value by a first plurality of circuits;
 subtracting said aligned operand fractions;
 negating an operand fraction resulting from said subtracting step when necessary;
 detecting a leading one signal in said resulting operand fraction by said first plurality of circuits;
 normalizing said resulting operand fraction; and
 rounding said resulting operand fraction.

9. The method of performing an effective subtraction operation of claim 8 further comprising the steps of:
 calculating said "sticky" bit value by said first plurality of circuits in response to a first control signal; and
 determining said leading one signal by said first plurality of circuits in response to a second control signal.

10. The method of performing an effective subtraction operation of claim 9 further comprising the step of implementing said first plurality of circuits by a Manchester chain of circuits.

11. The method of performing an effective subtraction operation of claim 10 further comprising the step of coupling each of said first plurality of circuits to a bit position of an operand register.

12. A chain circuit for use with a floating point processing unit, said chain circuit comprising:
 a plurality of circuit means, each circuit means adapted to receive a operand bit signal indicative of a logic signal stored in an associated operand register cell of said floating point processor, said each circuit means receiving a transfer in signal from a circuit means associated with a next more significant operand register cell, said each circuit means applying a transfer out signal to a circuit means associated with a next less significant operand register cell, said each circuit means for receiving a first and a second control signal, said each circuit means identifying an alignment shift value in response to said first control signal and predetermined signals for said transfer in signal and for said operand bit signal, said each circuit means for identifying a "sticky" bit value in response to a right shift signal and said second control signal and predetermined signals for said transfer in signal and for said operand bit signal.

13. The chain circuit of claim 12 wherein said plurality of circuit means form a Manchester chain, said each circuit means having a terminal for precharging transistors of said Manchester chain.

14. The circuit chain of claim 13 wherein said alignment shift value is used by said floating point processor for normalization of said leading one position of an operand stored in said operand register.

15. The chain circuit of claim 13 wherein said each circuit means includes a first transistor, said first transistor controlling a transfer of said transfer in signal through said circuit means in response to a signal applied to a gate terminal of said transistors.

16. The chain circuit of claim 15 wherein said chain signal is a ("STICKY" BIT)' signal when said second control signal is present.

17. The chain circuit of claim 15 wherein said circuit means further include:
 a precharging transistor coupled to said terminal for precharging and to an input terminal of said first transistor;
 a second transistor coupled to said first transistor input terminal; and
 an inverter circuit receiving input signals of said right shift signal and said operand bit signal, said inverter circuit applying an output signal to a gate terminal of said first transistor.

18. The chain circuit of claim 14 wherein a difference between operand exponent arguments by said floating point processing unit determines said right shift signal.

* * * * *